United States Patent [19]
Eberle et al.

[11] Patent Number: 5,505,744
[45] Date of Patent: Apr. 9, 1996

[54] METHOD AND APPARATUS FOR CASTING STRAPS AND TERMINALS ON LUGS OF STORAGE BATTERY PLATES

[76] Inventors: William J. Eberle, 102 Oak Forest Trail; Terry R. Eberle, 1500 N. Main; William K. Eberle, 1019 Irion, all of Euless, Tex. 76039; Kelly L. Eberle, 1303 Towne Colony Dr., Irving, Tex. 75061

[21] Appl. No.: 287,928
[22] Filed: Aug. 9, 1994
[51] Int. Cl.$^6$ .................................................. H01M 2/24
[52] U.S. Cl. .................... 29/623.4; 29/623.5; 29/730; 427/123; 427/431; 427/436
[58] Field of Search .............................. 29/623.4, 623.5, 29/730; 427/123, 115, 431, 436; H01M 2/24, 2/26, 2/28

[56] References Cited

U.S. PATENT DOCUMENTS

| | | | |
|---|---|---|---|
| 3,912,544 | 10/1975 | Sabatino | 427/123 X |
| 5,198,313 | 3/1993 | Juergens | 29/623.5 X |
| 5,253,795 | 10/1993 | Sato | 29/623.4 |

FOREIGN PATENT DOCUMENTS

88/02930  4/1988  WIPO .................... H01M 2/28

Primary Examiner—Stephen Kalafut
Attorney, Agent, or Firm—W. J. Scherback

[57] ABSTRACT

A system for casting straps and terminals on lugs of storage batteries includes a loading station including means for receiving at least one non-metallic battery case having a plurality of plates and separators partially inserted in the case with lugs extending out of the case. Clamping structure holds the battery case in position and includes metallic structure for overlying edges of the case to insulate the edges of the battery case from heat. Means rotates the receiving means to position the lugs in a downward substantially vertical direction. Included is a casting mold for receiving molten lead. Transportation means moves the receiving means over the casting molds and lower the lugs into the casting mold. Following the setting of the lead, the receiving means is transported to an un-loading station where the battery case is removed from the receiving means. The casting mold includes a vent for letting air from the mold as molten lead is added to the mold. The vent terminates in an exit port having an effective diameter of no more than 0.5 thousand inch.

12 Claims, 7 Drawing Sheets

METHOD AND APPARATUS FOR CASTING STRAPS AND TERMINALS ON LUGS OF STORAGE BATTERY PLATES

BACKGROUND OF THE INVENTION

1. Field of the Invention

This invention relates to the manufacture of lead acid storage batteries and more particularly to method and apparatus for casting straps and terminals on lugs of battery plates.

2. Prior Art

A cast-on method of forming straps to battery plates is described in U.S. Pat. No. 3,652,337. A number of alternately spaced positively and negatively plates with separators there between form a cell group which ultimately forms one cell of the finished battery. The lugs of the plate within the cell group form two rows of lugs, a positive row and a negative row. These lugs are cleaned, coated with a lead alloy melt and then rapidly transferred to a plate strap casting station where the lugs are emersed into a mold filled with molten-strap-forming material, typically lead. This patent does not treat the formation of battery terminals for which will require an additional technique and the utilization of a production station.

One apparatus, while widely used for accomplishing the task of communing the battery lugs within each stack is the Farmer Cast-On-Strap (C.O.S.) Machine. The Farmer machine is adapted to produce, in a single cycle, a plurality of finally assembled stacks sufficient to make up one battery. The strap casting operation is done within the C.O.S. apparatus by holding the stacks in a rectangular-multi-celled device commonly referred to as a basket, while the straps are cast onto the lugs. After the casting process the stacks must be removed from the basket and inserted into compartments of a battery case. A problem with the C.O.S. procedure is the fragility of the lead sulfate paste. With any degree of rough handling, fragments of it will break free. Therefore, extreme care must be exercised in moving the cast-on battery plates from the basket to the battery case compartment which must be exercised with care and therefore is time consuming and materially adds to the costs of battery manufacture.

SUMMARY OF THE INVENTION

The present invention is particularly well suited for the manufacture of single cell electric storage batteries of the type commonly found in rechargeable flashlights. In accordance with the present invention the straps and terminals are formed on lugs of storage battery plates in one molding step. More particularly, the method of the present invention in casting straps and terminals on lugs of storage battery plates includes the steps of gathering a group of battery plates and separators comprising a battery cell and placing them partially within a non-metallic battery case with the lugs of the plates extending out of the non-metallic case. The battery case is then partially inserted in a carrier at a loading station and a heat shield is placed about the exposed edges of the case adjacent the plate lugs to protect the edges of the battery case from the heat present in a casting mold. The carrier is then rotated to orient the lugs in a downward direction and the carrier lowered toward a casting mold to cause the lugs to be emersed in molten lead. After the setting of the lead, the carrier is raised and moved to an unloading station where the battery case is removed from the carrier and the plates and separators moved fully within the battery case to a seated level ready for final processing. Prior to being introduced into the molten lead of the mold the lugs are aligned and coated with a flux material.

In a preferred embodiment of the present invention a system for casting straps and terminals onto lugs of storage battery plates comprises a loading station, including receiving means having a plurality of chambers for receiving non-metallic battery cases, each containing a plurality of plates and separators partially inserted into each case with plate lugs extending out of the cases. Means are provided for closing said chambers upon the cases to clamp the cases and hold them in position with each chamber including metallic structure for overlying edges of the cases when said chambers are in a closed position to insulate the edges of the cases from heat. Means is provided for rotating the receiving means to position the lugs in a downward substantially vertical direction.

It is an object of the present invention to improve the efficiency of casting straps and terminals on lugs of storage battery plates.

It is another object of the present invention to reduce damage to battery plates by limiting the number of times the battery plates are subjected to physical handling.

DETAILED DESCRIPTION

Figure 1:
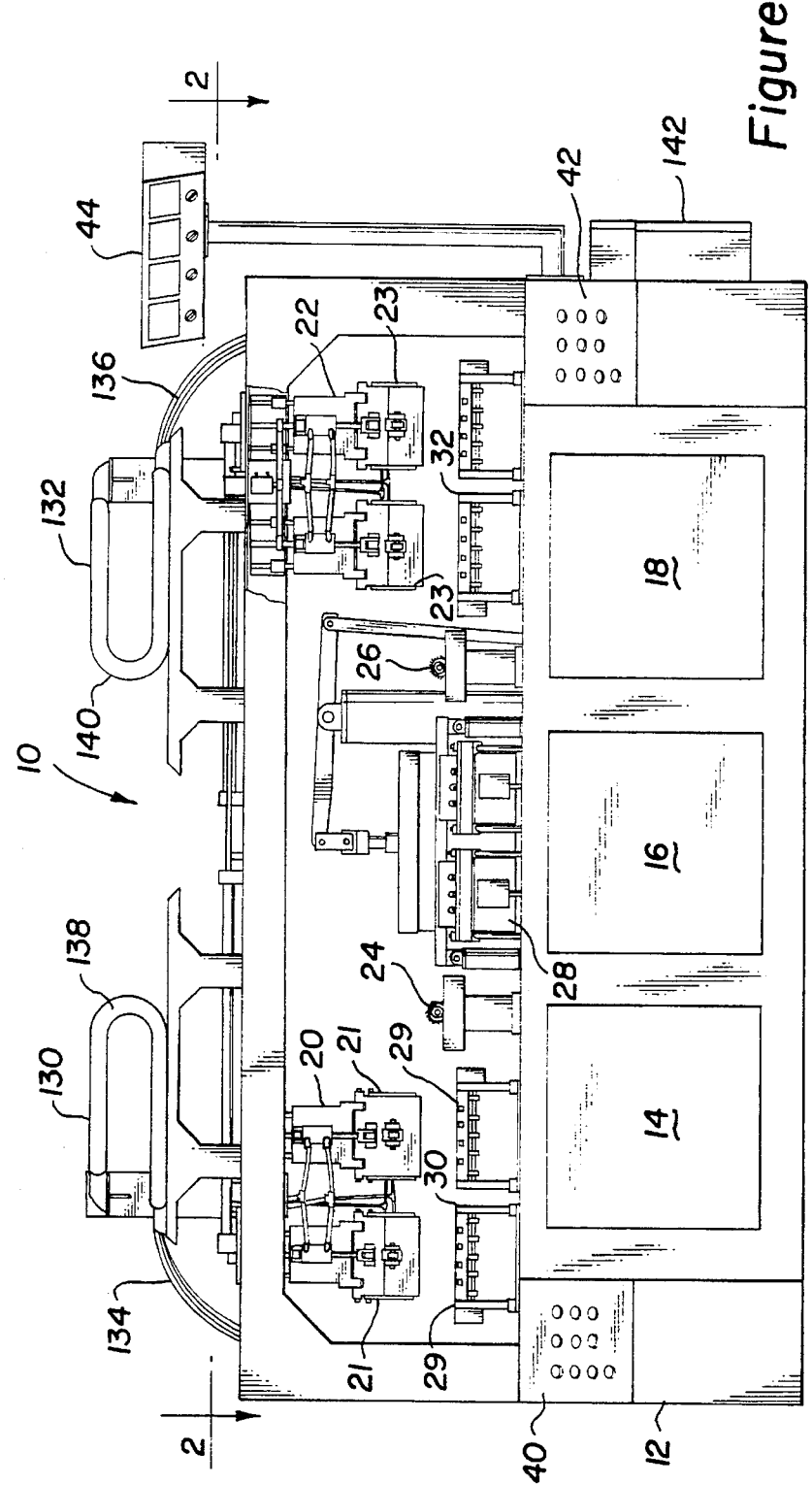
FIG. 1 is a front plan view of the system of the present invention for casting straps and terminals on lugs of storage battery plates.

Referring now to FIG. 1 a system 10, embodying features of the present invention, is shown mounted on a base 12, including cabinets 14, 16, and 18. The system 10 includes a number of operating stations including loading-unloading station 20, 22 flux applying stations 24, 26 and cast-on mold station 28. Also included are lug alignment fixtures at stations 30 and 32.

Figure 2:
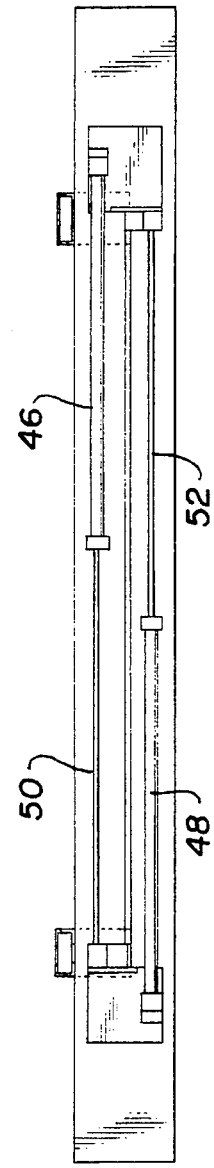
FIG. 2 is a partial top view of the system of FIG. 1 illustrating the hydraulic drives for moving carriages holding batteries from station to station.

The sequence of operations is as follows: storage batteries, in the present embodiment in number are located in chambers of the carriage 21 and the carriage lowered to position lugs of the batteries into the lug alignment fixtures 29 at station 30. A suitable lug alignment fixture is illustrated and described in U.S. Pat. No. 4,349,959 which by reference thereto is incorporated herewith. Following the lug straightening and aligning operation, the carriage 27 is raised and moved toward the fluxing station 24 where a suitable flux such as beef tallow is applied to the lugs as they are moved across the station 24. Following the fluxing operation, the carriage 21 is moved over the casting station 24 where the lugs are lowered into molds containing molten lead for the casting on of straps and terminals. The carriage 21 is now raised and moved to loading-unloading station 20 where the batteries are removed from the chambers of the carriage 21. In the meantime, batteries are loaded in chambers of the carriage 23, lowered into the lug straightening fixture at station 32, raised and moved toward fluxing station 26. The casting station is now re-loaded with molten lead and the lugs of the batteries contained in the chambers of carriage 23 are lowered in the molten lead in the molds at station 28 to cast on straps and terminals. Following the filling of the molds with molten lead, and prior to the insertion of the lugs into the molten lead, scrapers 30 and 32, comprised of thin metal blades, are moved across the upper surfaces of the mold in order to remove the convex minicus of lead at each mold. Control consoles 40 and 42 are provided with selector buttons to control operation of the systems, such for example as start, stop, automatic operation etc. A status indicator 44 is conveniently located to report on such parameters as the temperature of the molten lead and the temperature of the cooling water utilized in the molds to solidify the lead during the cast-on operations. The movement of the carriages 21 and 23 from station to station is effected by way of the hydraulic cylinders 46 and 48 (FIG. 2), whose pistons 50 and 52 are attached to the upper ends of the carriages 21 and 23.

Figure 3:
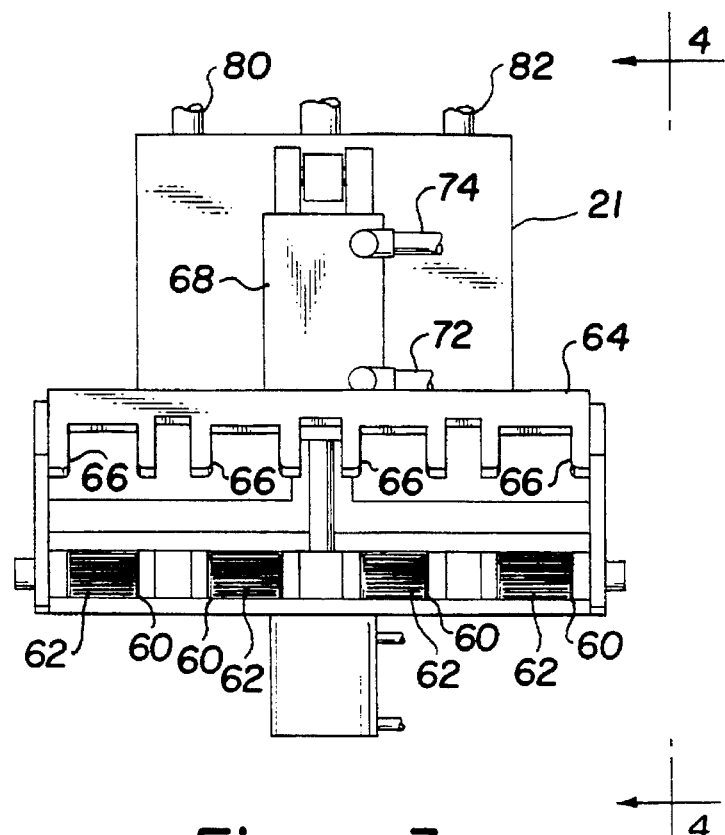
FIG. 3 front view of a carriage loaded with storage batteries to be processed.
Figures 5, 6:
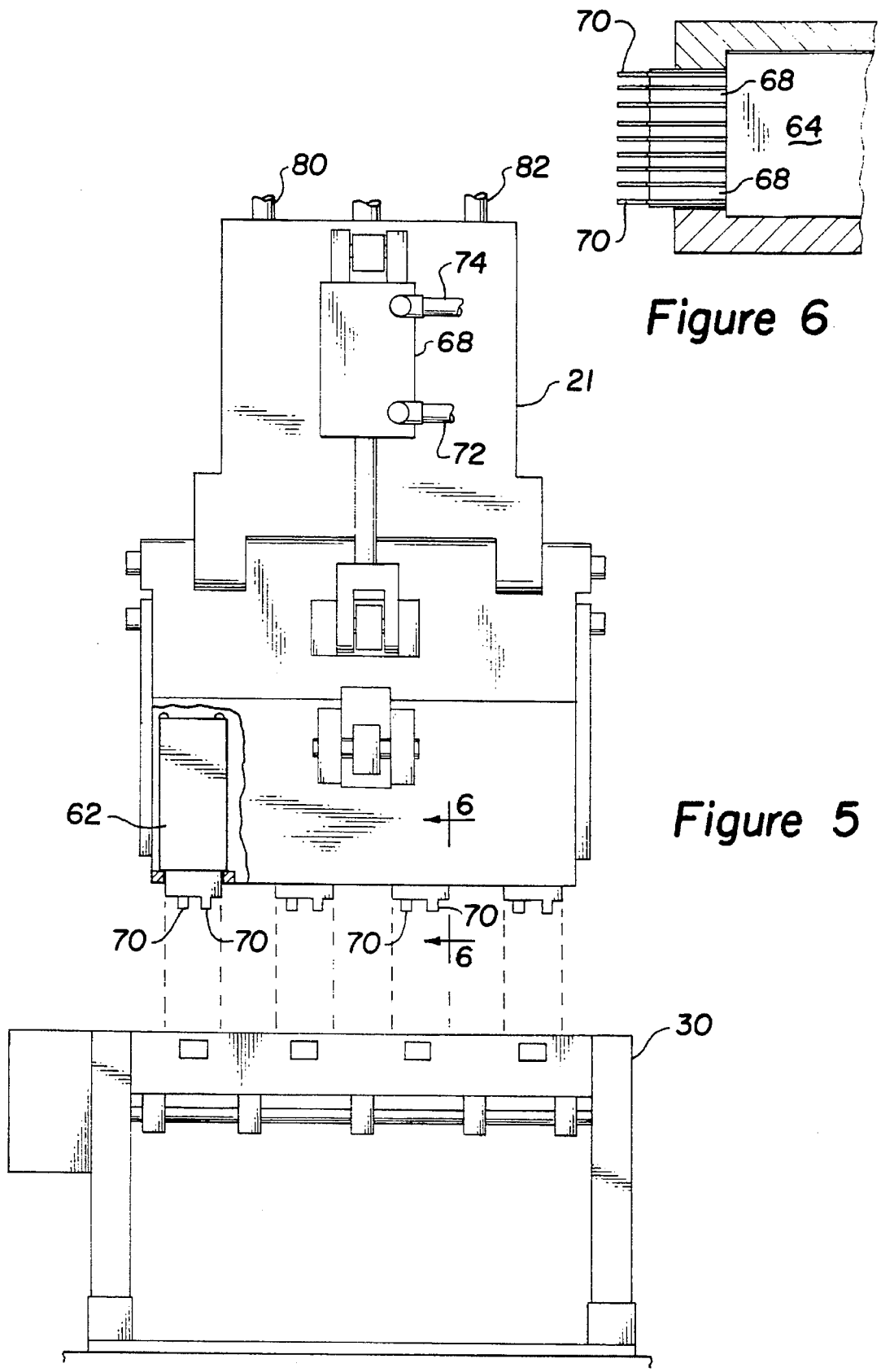
FIG. 5 is a front view of the carriage of FIG. 3 rotated such that the battery lugs are in a vertical position.
FIG. 6 is a partial view taken along lines 6—6 of FIG. 5 illustrating one of the storage batteries contained in one chamber of the carriage.
Figure 12:
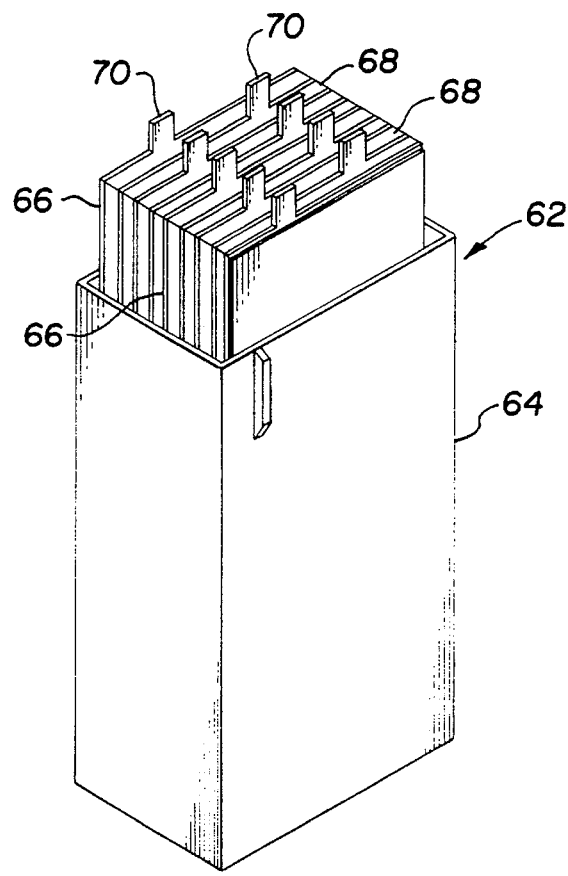
FIG. 12 illustrates a single cell storage battery, with a plastic casing, preparatory to the cast-on operation.

Referring now to FIG. 3, there is illustrated one-half of the carriage 21. Since the carriages 21 and 23 are identical, the description of one will be sufficient to understand the other. Carriage 21 includes a plurality of chambers 60 each shown containing a storage battery 62. Details of the battery 62 are shown in FIG. 6 and 12 to comprise a non-metallic casing 64 into which partially have been placed battery plates 66 and separators 68. Each of the plates 66 has associated with it a lug 70 onto which straps and terminals are to be cast.

Figure 4:
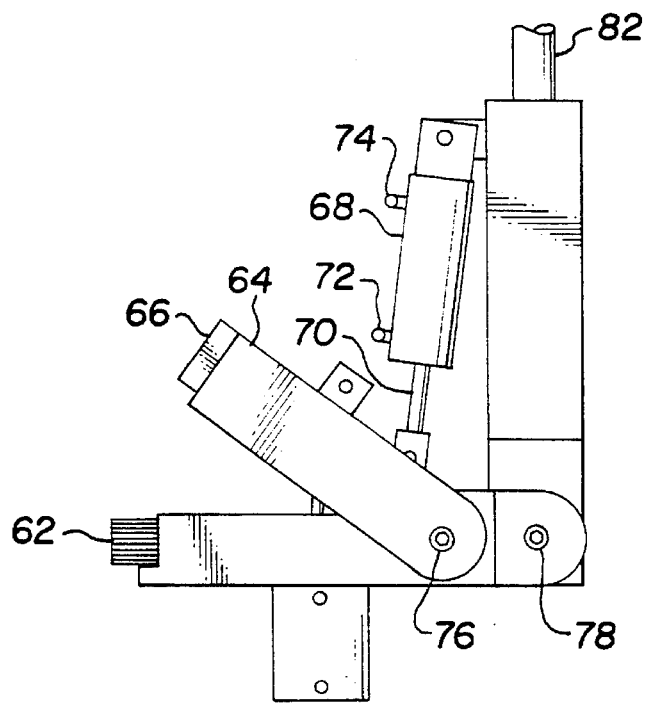
FIG. 4 is a side view of a carriage of FIG. 3 taken along lines of 4—4 of that figure.

Hinged above the chambers 60 is a clamping cover 64 provided with projections 66 which in a lowered position provide metallic structure for overlying edges of the non-metallic battery cases, as thus insulate the edges of the battery cases from heat at the molding station. The cover 64 is lowered into a clamping position by way of hydraulic cylinder 68 (FIG. 4) whose piston 70 is attached to the cover 64 and which derives pressurized hydraulic fluid by way of hoses 72 and 74 from a hydraulic source (not shown). Cover 64 is initially lowered about pivot point 76 into the aforesaid clamping position, and upon further movement of the piston rod 70, the clamped assembly is further rotated about pivot point 78, such that the battery lugs are oriented in a vertical position, facing downward, as shown in FIG. 5. The carriage 21 is now lowered on shafts 80 and 82; place the lugs 70 into the lug aligning fixture 29 at station 30; the lugs 70 are straightened and aligned to the extent necessary to prepare them for further processing.

Figure 7:
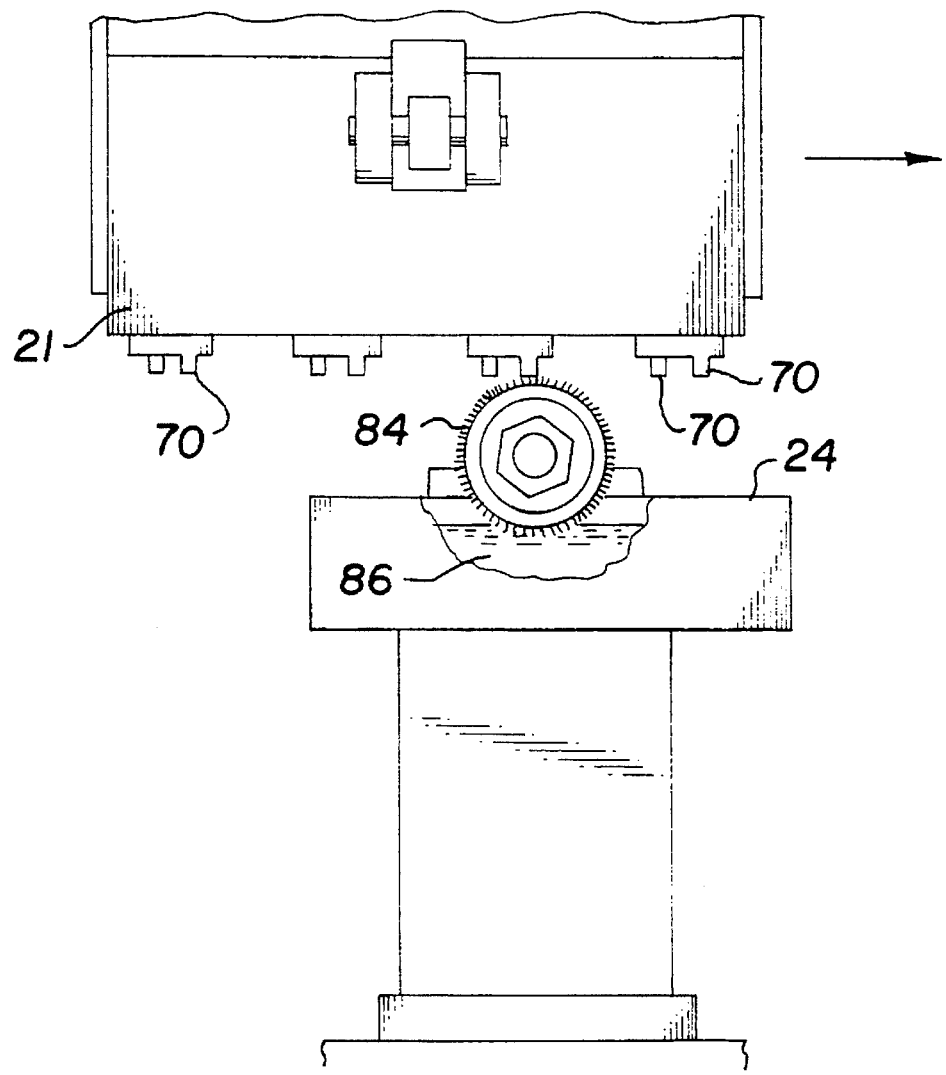
FIG. 7 depicts the carriage moving the battery lugs over a flux applying apparatus.

Carriage 21 is now raised and transported to and across flux applying station 24. The flux applying station 24 includes a rotatable cylinder 84 (FIG. 7) comprised of steel wool or similar material which on rotation by a suitable prime mover, picks up flux from bath 86 and applies the flux to the lugs 70 as they move by and in contact with the cylinder 84. It is important to note that unlike prior art flux applicators which require the lugs to be dipped into a bath of flux material wherein the amount of flux applied depends upon the level of flux in the bath the flux applying station of the present invention applies a controlled fixed amount of flux only to the tips of the lugs. The amount of flux applied is independent of the depth of flux material in the bath. The only criterion for successful operation is that a portion of the cylinder 84 contact the flux material as the cylinder 84 rotates. The amount of flux applied is just sufficient such that only the lugs are coated and the amount of flux applied is inadequate to migrate onto the battery plates which otherwise would affect the operation of the battery. The flux applying station includes a heater (not shown) for maintaining the flux in a liquid state.

Figure 8:
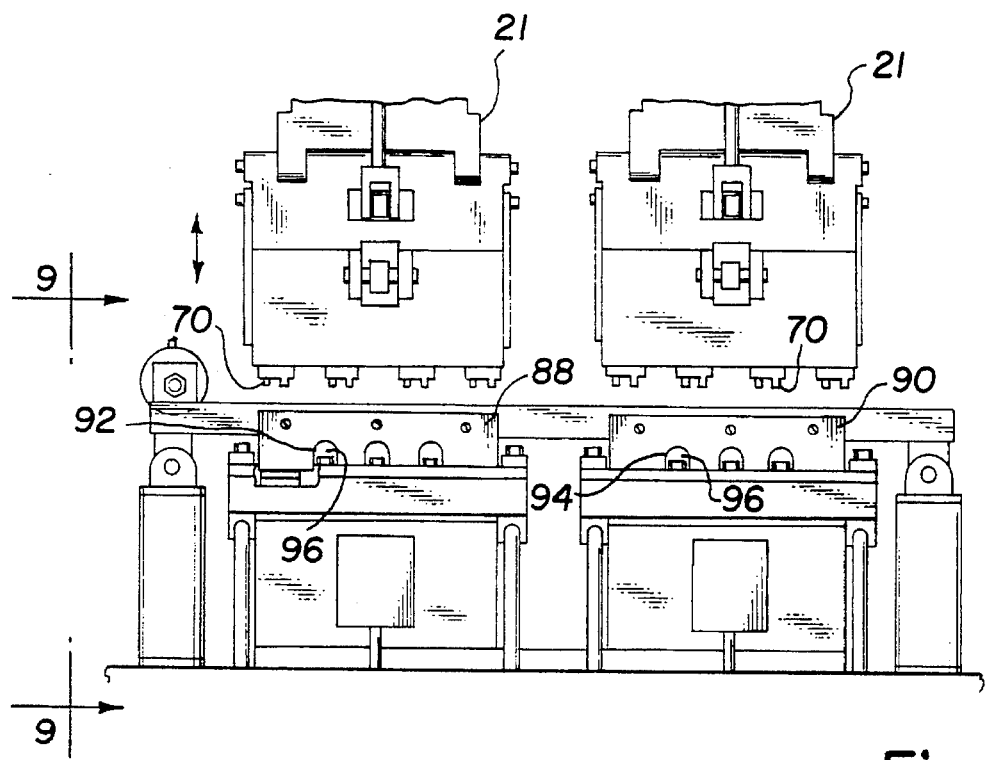
FIG. 8 illustrates the carriages located over the casting molds in position to lower the battery lugs into the casting mold.

The carriages 21 are now positioned above the mold station 28, in preparation for casting on the straps and terminals. Associated with the mold station is apparatus for supplying molten lead to the molds comprising the molding station 28. The molten lead applying apparatus is that illustrated and described in U.S. Pat. No. 5,170,835 issued Dec. 15, 1992 and assigned to Eberly Equipment, Inc., of Dallas, Tex. The disclosure of said U.S. Patent is hereby incorporated by reference. Upon loading the molds with molten lead a convex minicus is formed at each of the molds and must be removed prior to lowering the lugs into the molds. The removal of the minicus is accomplished by moving wiping blades 88 and 90, (FIG. 8) across and in contact with the upper surfaces of each of the molds. Wiping blades 88 and 90 are relieved at 92 and 94 respectively in order to clear any projections 96 extending above the upper surfaces of the molds.

Figure 9:
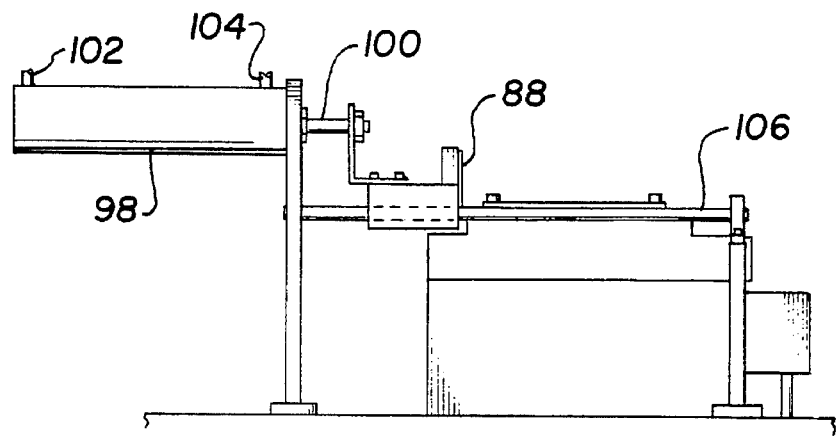
FIG. 9, partial side view, taken along lines 9—9 of FIG. 8 illustrating the mechanism for moving a scraper blade across the top of the mold.
Figure 10:
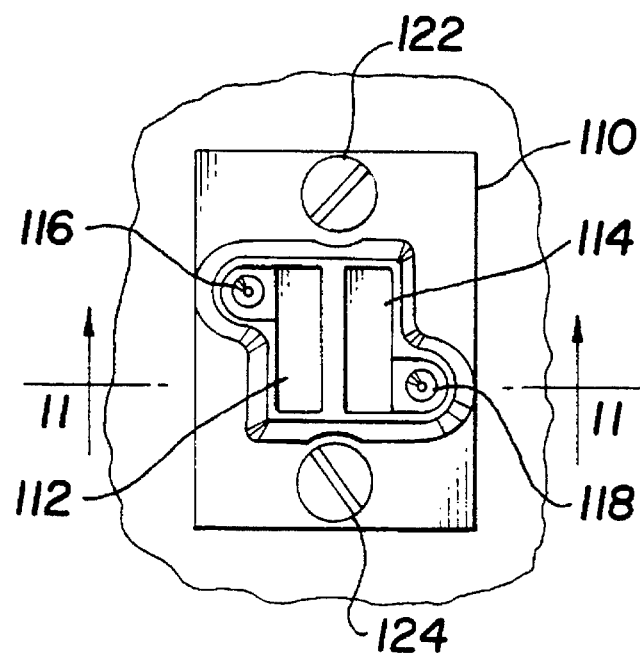
FIG. 10 is a top view of one of the casting molds.
Figure 11:
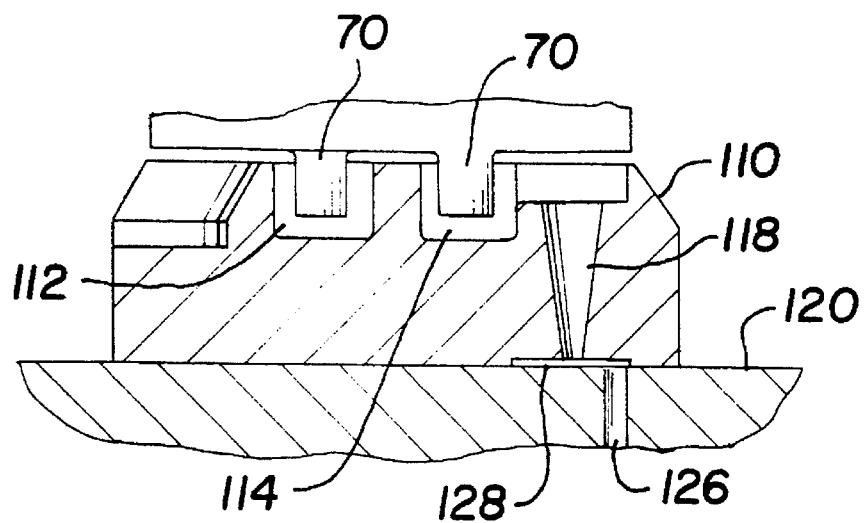
FIG. 11 is a cross section of the casting mold taken along lines 11—11 of FIG. 10.

Movement of the wiper blades 88 and 90 is shown in FIG. 9 to be accomplished by way of operation of a hydraulic cylinder 98 whose piston 100 is attached through mechanical structure to the wiping blade 88. The hydraulic cylinder receives pressurized hydraulic fluids by way of hoses 102 and 104 from a suitable source (not shown). Wiping blades 88 are guided across the top of the top surfaces of the molds by way of guide shaft 106. Following the wiping operation the carriages 21 are lowered to immerse the lugs 70 into the molds. The molds suitable for the practice of the present invention is illustrated in FIGS. 10 and 11 and shown to include strap cavities 114 and 112 and terminal cavities 116 and 118. Mold 110 is held or fastened to the base 120 by way of machine screws 122 and 124.

Base 120 of the mold is provided with an air vent 126. The vent 126 terminates in an exit port 128 communicating with the terminal cavity. Because of the small size of the molds 110, molten lead poured into the molds would tend to cool off rather rapidly, thus, necessitating that the molten lead be heating to a very high temperature; for example, between 800 and 900 degrees F. At that temperature molten lead is extremely fluid and would tend to flow through the air vents 126. To prevent the flow of molten lead from the mold through the vent 126, the exit port 128 must be very small; in fact, cannot exceed 0.5 thousands of an inch. An exit port of that small size cannot be mechanically drilled. In accordance with the present invention the exit port 128 is provided by very carefully milling the underside of the mold to a depth of 0.5 thousands of an inch to provide air communication between the terminal cavity 118 and the vent 126 while at the same time preventing the flow of molten lead out of the mold. Following emersion of the lugs 69 into the mold 110, water is injected to cool the mold 110 and to solidify the lead within the chambers 112, 114, 116, and 118. Upon solidification, the carriage 21 is raised removing the batteries from their respective molds, and the carriage 21 is then transported back to the loading-unloading station 20 shown in FIG. 1.

In order to increase the number of batteries produced during a given time interval, there may be provided the carriage 23 lug alignment fixtures at station 32 and the flux application apparatus at station 26. When the carriage 21 has been withdrawn from the molding station 28 and begins its movement toward the loading-unloading station 20, the system causes carriage 23 to begin operations in manner like that described with respect to carriage 21 to move toward the common molding station 28. The carriages 21 are now unloaded and are then re-loaded with additional batteries to be processed. Alternate operation of the carriages 21 and 23 significantly increases the production of the system 10.

Figure 13:
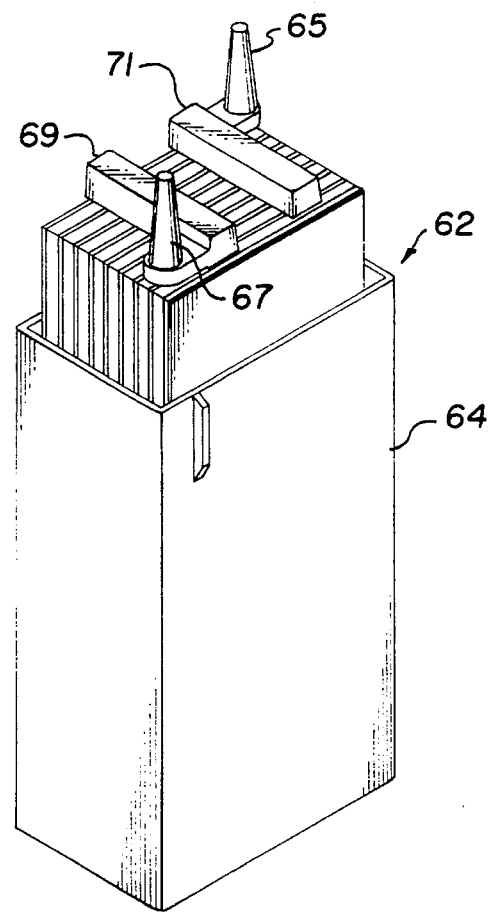
FIG. 13 illustrates the storage battery of FIG. 12 following the cast-on operation.

Upon withdrawal from carriage 21, following the cast-on operation, each battery 62 appears as shown in FIG. 13. Straps 69 and 71 respectively, connect lugs of negative and positive plates and ae in turn connected to terminals 67 and 65. The plates are now pushed down into case 64 where upon acid is added and the battery case sealed.

Hose tracks, 130, 132 (FIG. 1) are provided to avoid entanglement of the hoses in hose groups 134 and 136 as the carriages 21 and 23 are moved from station to station. Tracks 130 and 132 are comprised of pivoted segments 138 and 140 which enable the hose tracks 130 and 132 to move with the hose groups 134 and 136, which avoids entangling of the hoses comprising the groups 134 and 136.

The operation of the system preferably is managed by a programmable controller to be located within the cabinet 142 or if preferred, within the cabinets 14, 16, or 18. A suitable programmable controller is the OMRON PC C60K. It is well within the skill of the art properly to program the controller to implement whatever functions are to be provided by the various components of the system 10.

In view of the above description, modifications may occur to those skilled in the art and it is intended to cover such modifications as fall within the scope of the appended claims.

What is claimed is:

1. A method of casting straps and terminals on lugs of storage battery pates comprising the steps of:
   a) gathering a group of battery plates and separators comprising a battery cell group,
   b) placing the group of plates and separators partially within a non-metallic battery case with the lugs of the plates extending out of the case,
   c) at a loading station placing the battery case partially in a carrier,
   d) placing a heat shield about the edges of the case adjacent the plate lugs,
   e) rotating the carrier to orient the lugs in a downward direction,
   f) lowering the carrier toward a casting mold to cause the lugs to be immersed in molten lead, and
   g) raising the carrier following setting of the lead.

2. The method of claim 1 in which the battery case and cast lugs are transported to an unloading station where the battery case is removed and the plates and separators are moved fully within the battery case ready for addition of acid.

3. The method of claim 1 in which the lugs are coated with a flux material prior to being lowered into the mold.

4. The method of claim 3 in which the lugs are aligned prior to being coated with the flux material.

5. A system for casting straps and terminals onto lugs of storage battery plates comprising;
   a) a loading station including means for receiving at least one non-metallic battery case having a plurality of plates and separators partially inserted in the case with lugs extending out of the case,
   b) said receiving means including means for clamping and holding the case in position and including metallic structure for overlying edges of the case and thus insulate the edges from heat,
   c) means for rotating said receiving means to position the lugs in a downward direction,
   d) a casting mold for receiving molten lead,
   e) means for transporting said receiving means to said casting mold form casting straps and terminals onto the lugs,
   f) means for lowering said receiving means to insert the lugs into the molten lead,
   g) means for raising said receiving means to withdraw the lugs from said mold after the lead has set, and
   h) means for transporting said receiving means to an unloading station where the case is removed from said receiving means.

6. The system of claim 5 including means for aligning and straightening the lugs prior to transportation to said casting mold.

7. The system of claim 6 including means for applying a flux material to the lugs positioned after said means for aligning and prior to said casting mold.

8. The system of claim 5 in which said casting mold includes a vent for venting air from said mold as molten lead is added to said mold, said vent terminating in an exit port providing a passage of not more than 0.5 thousand square inch.

9. A system for casting straps and terminals onto lugs of storage battery plates comprising;
   a) a loading station including receiving means having a plurality of chambers for receiving non-metallic battery cases each containing a plurality of plates and separators partially inserted into each case with plate lugs extending out of the cases,
   b) means for closing said chambers upon the cases to clamp the cases and hold them in position, each chamber including metallic structure for overlying edges of the cases when said chambers are in a closed position to insulate the edges of the cases from heat,
   c) means for rotating said receiving means to position the hugs in a downward direction,
   d) a casting mold structure for receiving molten lead and having a plurality of casting molds equal to the number of battery cases,
   e) means for transporting said receiving means and battery cases to a position over said casting mold structure,
   f) means for lowering said receiving means to insert the lugs into the molten lead contained in said casting molds,
   g) means for raising said receiving means to withdraw the lugs from said molds after the lead has set, and
   h) means for transporting said receiving means to an unloading station where the cases are to be removed from said chambers.

10. The system of claim 9 wherein a second receiving means with chambers is positioned on an opposite side of said mold structure and transportable to said mold structure after said first mentioned receiving structure has been transported toward its unloading station.

11. The system of claim 5 including means for flooding said casting mold with molten lead and for releasing molten lead from about the body of said casting mold leaving a convex meniscus of molten lead within said casting mold, wiping means moveable across and in contact with an upper surface of said casting mold to remove the meniscus prior to lowering the lugs into the molten lead.

12. The system of claim 7 in which said means for applying flux material comprises a container for holding flux material and a rotatable brush for contacting the flux material in said container and carrying the flux material into contact with tips only of said lugs.

* * * * *